United States Patent
Ballu

(10) Patent No.: US 6,269,847 B1
(45) Date of Patent: Aug. 7, 2001

(54) DEVICE FOR LAYING DUST CONTAINED IN A BULK PRODUCT

(75) Inventor: Patrick Ballu, Reims (FR)

(73) Assignee: Exel Industries, Epernay (FR)

( * ) Notice: Subject to any disclaimer, the term of this patent is extended or adjusted under 35 U.S.C. 154(b) by 0 days.

(21) Appl. No.: 09/465,693

(22) Filed: Dec. 17, 1999

(30) Foreign Application Priority Data

Dec. 18, 1998 (FR) .................................................. 98 16035

(51) Int. Cl.⁷ ........................................................ B65B 1/04
(52) U.S. Cl. ............................ 141/69; 141/286; 239/424
(58) Field of Search ................................ 141/69, 70, 67, 141/285, 286; 239/418, 419, 424, 433, 434.5

(56) References Cited

U.S. PATENT DOCUMENTS

| 2,973,740 | 3/1961 | Hopkins et al. . |
| 4,347,876 | * 9/1982 | Morgan . |
| 5,992,529 | * 11/1999 | Williams . |

FOREIGN PATENT DOCUMENTS

| 3316030A | 11/1984 | (DE) . |
| 2684972A | 6/1993 | (FR) . |

* cited by examiner

*Primary Examiner*—Steven O. Douglas
(74) *Attorney, Agent, or Firm*—Stevens, Davis, Miller & Mosher, LLP

(57) ABSTRACT

A device for laying dust contained in a flow of bulk product during transfer thereof includes a divergent cone onto whose outside surface the product is directed from a feed pipe to form a tubular layer of product. A mounting device holds the cone in the flow of product leaving the feed pipe and at least one device fixed to the mounting device sprays a moistening liquid to moisten the inside envelope of the layer of product. The spray device has at least one central nozzle in a spray moistening area downstream of the cone to moisten the part of the inside envelope of the product layer downstream of the cone. The structure of the device is such that the thickness of the tubular layer of the flow of product can be freely chosen at least until the flow leaves the area, the layer thereafter retaining its hollow annular shape. Applications include laying dust contained in grain when it is transferred into cells of a storage silo.

23 Claims, 1 Drawing Sheet

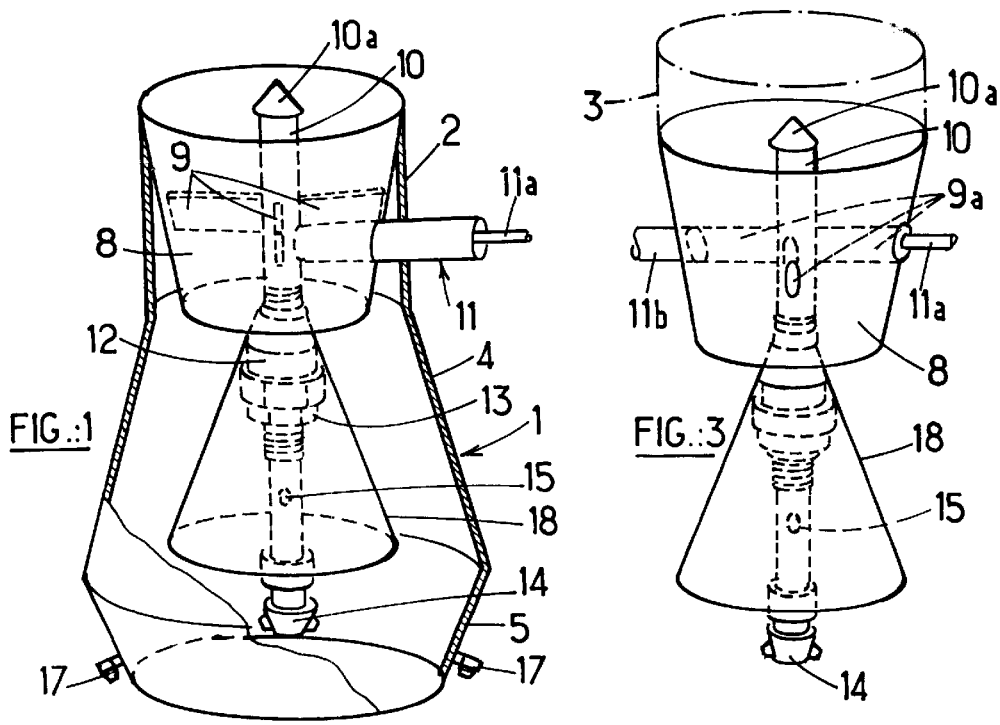
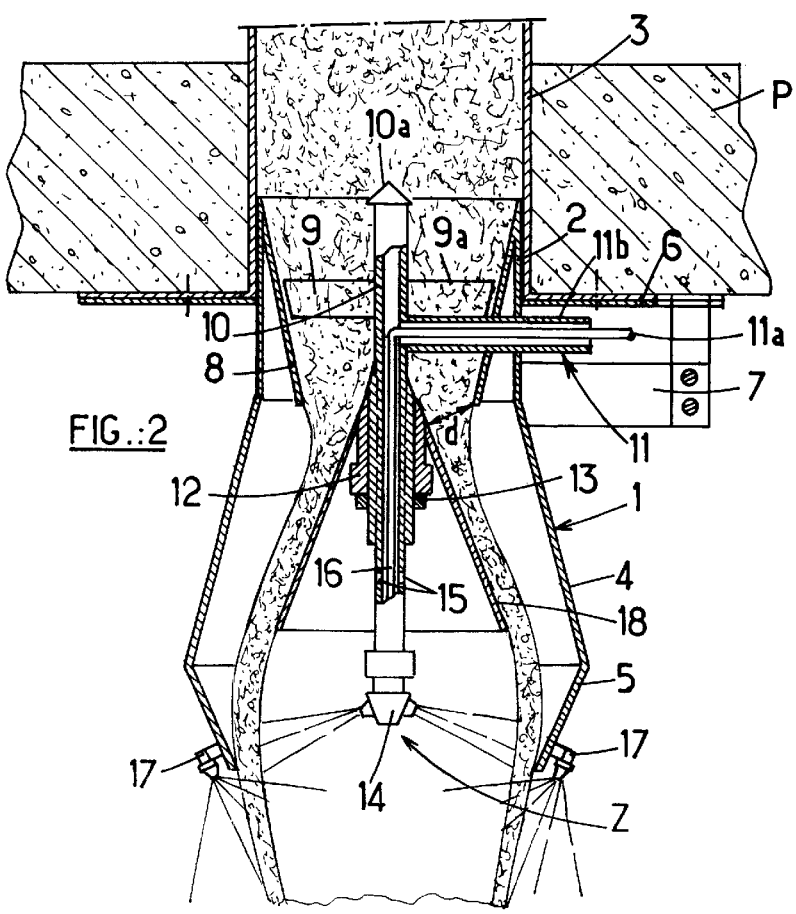

DEVICE FOR LAYING DUST CONTAINED IN A BULK PRODUCT

BACKGROUND OF THE INVENTION

1. Field of the Invention

The present invention relates to handling bulk product such as agricultural produce, in particular grain or other similar products, that can also contain a powder component referred to hereinafter as "dust".

The invention relates more particularly to a device for laying dust contained in a flow of bulk product during transfer thereof.

Transfer can be effected in order to fill or empty a silo, a transportation vehicle such as a railroad wagon, truck or grain bulk-carrier ship or a storage heap. The invention finds one particularly useful application in cells of a silo for storing grain and in ducts for transferring grain to a storage area or transport vehicle.

The presence of dust in bulk product can be a great nuisance because dust that separates from the product during transfer forms a suspension in the air and can then degrade the cleanliness of the storage place or the environment. In the case of grain silos, the dust can even cause risks of fire or explosion, similar to those associated with coal "dust", for example.

2. Description of the Prior Art

In the dust-laying device described in U.S. Pat. No. 2,973,740, a divergent cone is placed in a casing which, as seen in the direction of flow of the product, narrows until the product enters a pipe connected to the dust-laying device. The layer of product formed downstream of the divergent cone is therefore obliged to become narrowed along the inside surface of the casing. This retards the forward movement of the layer, which reduces the flowrate at which the product passes into the dust-laying device. Also, the structure of the above prior art dust-laying device soils readily because as it moves forward the product is confined within an increasingly small space. Finally, the spray device is housed inside the cone and therefore cannot spray directly onto the outside envelope of the layer, but only from the interior of the divergent cone. It is also found that the above prior art device retards the flow of the product downstream of the spray area, which can become completely invaded by the product if the downstream flow is stopped.

The object of the invention is to provide a device for laying dust contained in a bulk product which remedies the drawbacks of the prior art dust-laying device.

SUMMARY OF THE INVENTION

The invention therefore consists in a device for laying dust contained in a flow of bulk product during transfer thereof, the device comprising a divergent cone onto whose outside surface the product is directed from a feed pipe to form a tubular layer of product, a mounting device for holding the cone in the flow of product leaving the feed pipe and at least one device fixed to the mounting device for spraying a moistening liquid to moisten the inside envelope of the layer of product, wherein the spray device comprises at least one central nozzle in a spray moistening area downstream of the cone to moisten the part of the inside envelope of the product layer downstream of the cone and the structure of the device is such that the thickness of the tubular layer of the flow of product can form freely at least until the flow leaves the area, the layer thereafter retaining its hollow annular shape.

Thanks to the above features, particularly effective laying of dust is obtained by direct spraying of a moistening liquid onto the tubular layer of bulk product, without forward motion of the layer being retarded. The device can therefore work with a high flowrate and soiling of the device is minimized. Finally, the device makes it possible to spray the moistening liquid onto the outside envelope of the layer of product.

Other features and advantages of the invention will become apparent during the course of the following description which is given by way of example only and with reference to the accompanying drawing.

BRIEF DESCRIPTION OF THE DRAWING

FIG. 1 is a perspective view of a first embodiment of a dust-laying device in accordance with the invention.

FIG. 2 is a view of the same device in vertical section, installed in the ceiling of a grain silo, above one of the cells of the silo.

FIG. 3 is a perspective view of a second embodiment of the invention.

DETAILED DESCRIPTION OF THE PREFERRED EMBODIMENTS

Referring to the drawing, it can be seen that in one preferred embodiment of the invention, more particularly intended to be used in the situation where the bulk product is an agricultural product and especially grain, the dust-laying device comprises a circular casing 1 having a cylindrical inlet 2 at the top, possibly narrowing in the upward direction with a very slight taper. The inlet 2 is designed to be a tight fit in a pipe 3 feeding the bulk product. In the non-limiting example described here, the pipe 3 can be that provided above each storage cell of a grain silo, for example, in which case the dust-laying device is installed so that its axis is vertical or inclined to the vertical.

The inlet 2 is connected to an intermediate part 4 of the casing 1 of frustoconical shape and diverging in the direction of flow. The intermediate part 4 is in turn connected to a lower part 5 of the casing 1, also of frustoconical shape, but the opposite way around to the part 4, i.e. narrowing in the downstream direction. In one variant the lower part 5 can be omitted.

The casing 1 therefore forms a transfer volume for conveying the bulk product from the feed pipe 3 to the cell of the silo above which the dust-laying device is provided.

When, as shown here, the dust-laying device must be fixed against the ceiling P of the silo, a horizontal fixing flange 6 is advantageously provided around the pipe 3 to enable such fixing. For angular positioning of the device around its vertical axis, a fixing lug 7 is provided, attached to a pin or the like (not shown) anchored in the ceiling P of the silo.

Supporting spacers 9 in the inlet 2 extend radially inwards. There are preferably three spacers at 120° to each other around the axis of the device. The spacers preferably have a section profiled so that it does not impede the flow of product (similar to that of an airfoil) and support a central mounting member comprising an axial hollow shaft 10 whose upper end is closed by an upwardly directed point 10a to facilitate the flow of product.

One of the spacers 9 also supports a double tube 11 formed of two coaxial tube sections, namely an inner section 11a connected to a pressurized liquid supply (not shown) and an outer section 11b connected to a compressed air supply (also not shown).

A sleeve 12 is screwed onto the hollow shaft 10 and immobilized by a nut 13. The lower end of the hollow shaft carries one or more spray nozzles 14.

Three holes 15 in the shaft 10 at 120° to each other provide air outlets.

The spray nozzle(s) 14 are fed from a pipe 16 inside the shaft 10 and forming an extension of the tube section 11a. The pipe 16 has an outside diameter such that there is an air passage around it which communicates with the tube section 11b and discharges into the internal volume of the casing 1 via the holes 15.

Spray nozzles 17, which are preferably outside the casing 1, are provided at the periphery of its lower part 5 or intermediate part 4, where applicable. These nozzles communicate with the tube section 11a feeding a spray liquid via a pipe, not shown, or are fed by a separate pipe (also not shown), which enables separate adjustment of the pressure and the flowrate in the nozzles 14 and 17.

The spray liquid can be water whose wetting power has been improved by adding a surfactant which is of vegetable origin and of foodstuffs or foodstuffs-compatible grade if the bulk product is a food. The quantity of additive, which can be determined by experiment, is preferably from 0.05% to 2% of the quantity of water sprayed. The quantity of water, which can be determined by experiment, is preferably from 0.05% to 2% of the quantity of product passing through the dust-laying device per unit time.

Note that other moistening liquids can be used, such as extracts of consumable agricultural products, foodstuffs-compatible mineral oils or vegetable oils, rapeseed oil being one non-limiting example of a liquid of this kind. In this case, the range of proportions of the moistening liquid relative to the quantity of product transferred can be the same as in the case where water is used as the moistening agent.

A convergent entry cone or product guide chute 8 can be fixed to the inside of the inlet 2, as shown in the drawing by way of example. The chute 8 is frustoconical and converges in the direction of product flow. It extends as high as the junction between the inlet 2 and the intermediate part 4 of the casing 1. A second cone 18 which diverges in the direction of product flow is fixed around the sleeve 12. Its position can be adjusted relative to that of the inlet 2 or the chute 8, where applicable, by adjusting the sleeve 12 on the shaft 10. This adjustment determines the radial clearance d perpendicular to the surface of the cone 18 and therefore the annular passage between the bottom edge of the inlet 2 or the chute 8 and the cone 18. In this way the thickness of the annular layer of product flowing in the dust-laying device can be precisely adjusted. The cone 18 can also bring about natural aspiration of air through the orifices 15, which has the advantage of avoiding reduction in the pressure of this air.

This is how the dust-laying device works.

The bulk product is gravity fed or propelled mechanically through the feed pipe 3 and received in the inlet 2 or in the convergent chute 8 where it is centered relative to the axis of the dust-laying device.

It then drops onto the divergent distributor cone 18 on whose outside surface there forms an annular layer of product of variable thickness, FIG. 2 showing the position of the cone corresponding to the smallest thickness that can be obtained. The product is then accelerated by gravity, which contributes to progressively reducing the thickness of the layer and to improving its penetration by the sprayed liquid.

After passing beyond the lower edge of the distributor cone 18, the inside of the layer of product receives a first spray of liquid via the central nozzle(s) 14 and the very fine droplets of this spray provide initial moistening of the dust in suspension in the internal volume of the annular layer of product. As the nozzle(s) 14 spray in an area 7 downstream of the cone 18, the layer of product is directly moistened by the sprayed product with a high yield.

Then, on leaving the lower part 5, or where applicable the intermediate part 4, of the casing 1, the layer of product retains its hollow annular shape and a second stage of moistening is provided by the peripheral nozzles 17 directed toward the outside envelope of the layer of product, where the dust is also moistened. The flow of air through the orifices 15 scavenges the interior space of the annular layer of air and this draws droplets of the moistening liquid through the layer and so encourages the capture of dust, whilst avoiding soiling of the cone 18 and the nozzles 14 by the moistened dust deposited thereon as a result of turbulence.

Note that, in order to increase the surface area of contact of the spray with the dust in the bulk product, the cross sections of the various cones of the device, and where applicable of the casing, can be circular, oval, star shaped or polygonal, for example rectangular, it being clearly understood that the above examples are in no way limiting on the invention.

Blowing air can have a particular advantage in a grain silo, for example, where the air arriving via the pipe 11, whether forced in or drawn in by natural aspiration from the cone 18, can come from inside the silo itself. This avoids excessive influx of air from the outside and most importantly contributes to recycling the dust remaining in suspension in the air in the silo that the device has previously failed to capture.

It is even feasible to accelerate the recycling of air from the silo by using a venturi type air injector driven by compressed air to supply air under pressure to the tube section 11*b* to lay dust remaining in suspension, even after filling the silo, i.e. with no grain flowing through the device. This also enables the device to be used to remove dust from the air in the silo even in the absence of flow of product.

As it moves forward in the dust-laying device, the thickness of the layer of product can form freely and the layer is not in contact with the parts 4 or 5 of the outside casing 1 at least until it leaves the area Z. It is not subject to any constriction or retardation and can therefore move forward at a high flowrate, and even accelerate due gravity, which reduces its thickness.

In an embodiment which is not shown in the drawing, it is possible to omit the convergent inlet cone 8, in which case the divergent cone 18 has to be fastened to the inlet 2 or the pipe 3. How to achieve this will be evident to the skilled person.

The dust-laying device of the invention can be complemented by freezing protection means and a control system that controls the spray as a function of the presence or absence of bulk product in the chute 8. Such auxiliary means will be evident to the skilled person and need not be described in detail.

FIG. 3 is a perspective view of another embodiment of the invention including the convergent inlet cone 8, the divergent cone 18, a central mounting device formed essentially by the hollow shaft 10 and the sleeve 12 carrying the cone 18 and the central spray nozzle(s) 14. Note that in this case the fins 9*a* which connect the first cone 8 to the shaft 10 are hollow so that they can convey moistening liquid toward the pipe 16 and air through the space formed around it, respectively from tube sections 11a and 11b. Note also that in this variant an inlet like the inlet 2 can be used with or without the cone 8. Also, the casing 1 is omitted.

However, using the casing 1, with or without its extension 5, facilitates fixing and protecting the peripheral nozzles 17 and enables the layer of product to be oriented, without excessive divergence, to facilitate the distribution of the product onto the storage heap or into the transport vehicle.

The dust-laying device shown in FIG. 3 is designed to be mounted at the end of a bulk product transfer horn, which means that the device can be mobile to transfer product into a transport vehicle, such as a railroad wagon, truck or grain bulk-carrier ship, or onto a product storage heap. It can be manipulated by hand or mounted at the end of a handling rod or a remote-controlled arm.

There is claimed:

1. A device for laying dust contained in a flow of bulk product during transfer thereof, said device comprising a divergent cone onto whose outside surface said product is directed from a feed pipe to form a tubular layer of product, a mounting device for holding said cone in the flow of product leaving said feed pipe and at least one device fixed to said mounting device for spraying a moistening liquid to moisten the inside envelope of said layer of product, wherein said spray device comprises at least one central nozzle in a spray moistening area downstream of said cone to moisten the part of said inside envelope of said product layer downstream of said cone and the structure of said device is such that the thickness of said tubular layer of said flow of product can form freely, at least until said flow leaves said area, said layer thereafter retaining its hollow annular shape.

2. A dust-laying device as claimed in claim 1 including an outside casing coaxially surrounding said divergent cone and said area and wherein the shape of said casing is such that said layer is separated therefrom at least until said flow of product leaves said area.

3. The dust-laying device claimed in claim 2 wherein said casing has, relative to the direction of flow of said product, a first part which is at least partly divergent with a taper similar to that of said divergent cone and is connected to said feed pipe, said divergent cone being mounted in said first part of said casing.

4. The dust-laying device claimed in claim 2 wherein said casing has, relative to the direction of flow of said product, a convergent frustoconical outlet part.

5. The dust-laying device claimed in claim 2 wherein said casing has a circular, oval, star-shaped or polygonal, for example rectangular, cross section.

6. The dust-laying device claimed in claim 5 wherein said holding member is fixed by means of hollow radial fins which are used to convey said moistening liquid.

7. The dust-laying device claimed in claim 5 wherein said holding member is fixed by means of hollow radial fins which are used to convey air fed through the inside of said layer.

8. The dust-laying device claimed in claim 1 wherein said spray device comprises a plurality of spray nozzles mounted at the periphery of said casing so as to be able to moisten the outside of said layer of product.

9. A dust-laying device as claimed in claim 1 including means for feeding air to the inside of said tubular layer of product in said area downstream of said divergent cone.

10. The dust-laying device claimed in claim 9 wherein said air is drawn in as the result of a natural pressure drop created at said divergent cone by said flow of said bulk product.

11. The dust-laying device claimed in claim 9 wherein said air is injected under pressure into said area.

12. A dust-laying device as claimed in claim 1 including an entry cone fastened to said casing, placed at the outlet from said feed pipe downstream of said divergent cone and having a taper opposite that of said divergent cone.

13. A dust-laying device as claimed in claim 12 including means for adjusting the relative axial position of said divergent cone and said entry cone to adjust the thickness of said tubular layer of product.

14. The dust-laying device claimed in claim 12 wherein said divergent cone and/or said entry cone have a circular, oval, star-shaped or polygonal, for example rectangular, cross section.

15. The dust-laying device claimed in claim 1 wherein said mounting device comprises a holding member having a central shaft and a sleeve mounted around said shaft on which said divergent cone is mounted.

16. The dust-laying device claimed in claim 15 wherein said central spray nozzle(s) are mounted at a lower end of said shaft.

17. A dust-laying device as claimed in claim 16 including a pipe for said moistening liquid in said holding member and communicating with said central spray nozzle(s) and with a pressurized moistening liquid supply.

18. The dust-laying device claimed in claim 17 wherein said sleeve has air outlet orifices in an area inside said divergent cone and the space delimited in said holding member around said pipe communicates with an air supply.

19. The dust-laying device claimed in claim 1 wherein said moistening liquid is water to which a wetting agent has been added, preferably an agent of vegetable origin and of foodstuffs or foodstuffs-compatible grade.

20. The dust-laying device claimed in claim 1 wherein said moistening liquid is a food product extract, a foodstuff-compatible mineral oil or a vegetable oil and in particular rapeseed oil.

21. A grain silo including a cell and a dust-laying device as claimed in any of claims 1–20, wherein said dust-laying device is mounted above said cell.

22. A grain silo including a cell and a dust-laying device of any of claims 9–20, wherein said dust-laying device is mounted above said cell, and wherein air aspirated or injected into said area downstream of said divergent cone comes from inside said silo.

23. An apparatus comprising a product transfer pipe and a dust-laying device as claimed in any of claims 1 to 20 wherein said dust-laying device is mounted at the end of said product transfer pipe for use in a storage area or to fill a transport vehicle.

\* \* \* \* \*